United States Patent Office 3,374,888
Patented Mar. 26, 1968

3,374,888
SCREENING MACHINE
Werner Volpert and Horst Hagen, Oelde, Germany, assignors to Haver & Boecker, Oelde, Westphalia, Germany, a private corporation
Filed Nov. 2, 1964, Ser. No. 408,182
Claims priority, application Germany, Nov. 8, 1963, H 50,779
3 Claims. (Cl. 209—319)

This invention relates to screeing machines in general and in particular to a screening machine of the type wherein the screening of materials is accomplished by vibrating screening members, as constrasted with the type wherein the entire screen box is shaken.

More particularly, this invention is directed to an improved screening machine having an upper fine mesh screen member, an adjacent lower coarse mesh screen member which acts as a support for said fine mesh screen and limits the normal displacement thereof, independent tension adjustment mechanisms for each of said screen members, and means for exciting said screen members in normal vibration.

One advantage of the screening machine according to the invention lies in the feature of its independently adjustable tension control for the fine and the coarse screen members. In vibrating screen machines, successful operation, and fine screen life is significantly affected by the tension of the fine screen, which moves in a manner analagous to a normally excited membrane. If the tension is excessive, it may break forthwith, or strain to the extent where it flexes excessively and break early in its operating life.

Where the fine screen tension is initially insufficient, it will be flabby, and inefficient as a material size filter, and be subjected to fatigue failure, or flutter breakage. In general, the correct tension for a given fine screen will depend upon many factors, including the type of material, its flow rate through the screen, the vibration excitation frequency of the screen, the screen elastic properties, etc. Thus, with an adpustable fine screen tension control, the screen tension may be readily adjusted to a value which produces a desirable operating result, as determined from observation.

Since fine screens have relatively little load bearing capability themselves, it is necessary to provide them with underlying coarse screen members of greater load bearing capability which act as supports for said fine screens, limiting their deflection to a permissible value. These coarse screens, by reason of their larger mesh openings, present little interference to the passage of material particles which flow through the overlying fine screens.

For satisfactory screening operation, the tension of such coarse screens must be held within suitable limits as well. In certain prior art machines, the fine screen was laid on top of the coarse screen and the two were attached together in stretching folds, welts or clamping members, and stretched together. To prevent oscillations and rubbing of the two screens, they were frequently fastened together, or stitched at several locations on their surfaces.

In some prior art applications, the fine and coarse screens were laid together and mounted in a fixed prestressed condition on machine frames. Thus, in the prior art machines which used the combination of a fine screen and underlying coarse supporting screen, the provisions for tension adjustment, if any, have been limited to those wherein both screens are stretched, or tensioned simultaneously, whereas in the instant invention said screens can be tensioned independently of each other.

In addition to its improved and novel screen tensioning features, the instant invention provides an improved means for inducing normal vibrations in the screens. The screens are excited by reciprocating tappets, driven mechanically, or preferably electromagnetically by oscillating magnets. These tappets repeatedly strike corresponding impact plates which are operatively connected to either or both of the screens, and which in response to the blows of said tappets, induce normal vibrations in said screens. Since the tappets are not rigidly connected to either the screens or the impact plates, the tensioning and replacement of said screens can be performed quite easily and conveniently, in contrast to the prior art machines wherein the tappets are rigidly connected either to the screens or to impact plates fastened to the screens. In machines having tappets rigidly connected as aforesaid, there was the problem of tappet and impact plate tilting with changes in screen tension, and the hazard of excessive straining or tearing in the screens.

It is therefore, an object of the invention to provide a material screening machine having a fine mesh and an underlying coarse mesh support screen wherein the tension of each screen can be adjusted independently.

Another object of the invention is to provide a screening machine as aforesaid wherein each screen can be simply and conveniently replaced.

Still another and further object of the invention is to provide a screening machine as aforesaid having means for inducing normal vibrations in the screens without any rigid connection between said screens and the vibration means.

Other and further objects and advantages of the invention will appear in or become evident from the following detailed description and accompanying drawings in which.

Figure 1:
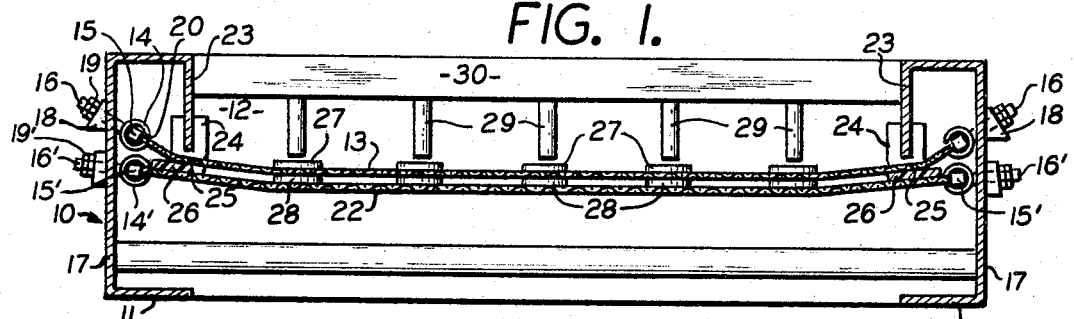
FIG. 1 is a side view, partially in section, of a typical screening machine according to the invention.

Referring now to FIG. 1, the material screening machine 10 has a screen frame 11 which is provided with a centrally disposed aperture 12 for the passage of material (not shown) to be screened therethrough. A fine mesh screen 13, which is substantially rectangular in plan form, is disposed across the aperture 12 and is supported by the frame 11 by means of the holding members 14 which engage spars 15 affixed to the edges of said screen 13.

Each of the holding members 14 is provided with at least one, and preferably a plurality of tension adjustment screws 16 affixed at one end thereto and extending outwardly therefrom through the sides 17 of the frame 11 and the bosses 18 affixed to the exterior surface of said sides 17, with nuts 19 being disposed in threaded engagement with said screws 16.

As shown by way of example in FIG. 1, the holding members 14 are cylindrical tubes having continuous longitudinal slots 20 which are of a width sufficient to permit the screen 13 to extend therethrough with suitable clearance, and retain the spars 15 within said holding members 14. This particular holding member 14 construction permits the screen 13 to be easily inserted and removed by sliding its spars 15 into the tubular members 14.

With the spars 15 thus inserted, the tension in the screen 13 can be adjusted by turning the nuts 19 on the screws 16 so as to move the holding members 14 outward to increase tension, or inward to decrease tension.

While the holding members 14 are illustrated as slotted tubes, it is understood that any other suitable configuration capable of engaging the spars 15 might be used. For example, a square tube or C-shaped channel could be substituted, or the spars 15 could be slotted with the holding member being in the form of an insertable rail. However, regardless of the holding member 14 and spar 15 cross-section used, the invention contemplates a holding member 14 and spar 15 configuration which will permit the screen 13 to be slid into supporting engagement with the holding members 14.

To provide support for the fine mesh screen 13, a coarse mesh screen 22 is disposed across the frame aperture 12 underneath said fine mesh screen 13, and is supported in a similar manner, having spars 15' fastened to its edges with holding members 14' engaging said spars 15' and tension adjustment screws 16' which cooperate with their corresponding nuts 19' for adjusting the tension of the screen 22 as in the case of the screen 13.

Thus, by turning the nuts 19 and 19' the tension of the screens 13 and 22 respectively can be independently adjusted to obtain optimum screening performance with a given material.

To prevent material from spilling over the edges of the screen 13 the frame 11 is made in the form of a channel having a downwardly extending interior lip 23, which defines the peripheral boundary of the aperture 12, with screen guide ledge members 24 being affixed to said lip 23 and extending downward past the edge thereof. The ledge members 24 have end surfaces 25 which are inclined upwardly toward the edges of the screen 13, and the holding members 14 are so disposed with respect to said ledge members that the screen 13 is bent upward at the boundary of the aperture 12 and is held in abutting contact with the end surfaces 25 when under tension, so that the ledge 24 acts as a barrier to prevent material from spilling off of the screen 13.

The holding members 14' which support the underlying coarse mesh screen 22 are disposed similarly with respect to the ledge members 24 so that the screen 22 is bent upward at the boundary of the aperture 12, but at a slightly lesser inclination than the screen 13.

An abrasion protective sheet 26, such as a plastic foil, is placed between the screens 13 and 22 in the area where they are bent by the ledges 24, so that when subjected to tension, the screen 22 is in abutting contact with the sheet 26, so that when the screens 13 and 22 are subjected to normal vibration, there will be no direct rubbing, or abrasion between them. This is essential to prevent damage of the fine mesh screen 13, and also serves to prevent particles of material which pass through the screen 13 from being temporarily caught between the screens 13 and 22 and being rubbed against the screen 13.

The screen 13 is provided with a plurality of upper impact plates 27 which are disposed at various locations on its top surface and are fastened thereto. A corresponding plurality of lower impact plates 28 are disposed between the screens 13 and 22 and underneath their respective upper impact plates 27. As desired, the lower impact plates 28 can be either fastened to the screen 22, or to the upper impact plates 27 with the screen 13 being sandwiched between the plates 27 and 28, or to the lower surface of the screen 13.

Alternatively, the plates 27 and 28 can be magnetized so as to be held together with the screen 13 in between. In such a case, the plates 27 and 28 should be constructed so as to have a sufficient magnetic attractive force that will prevent them from being pulled apart under vibration or by attraction between the lower plates 28 and coarse mesh screen 22 where the latter is made of a magnetic material.

Figure 2:
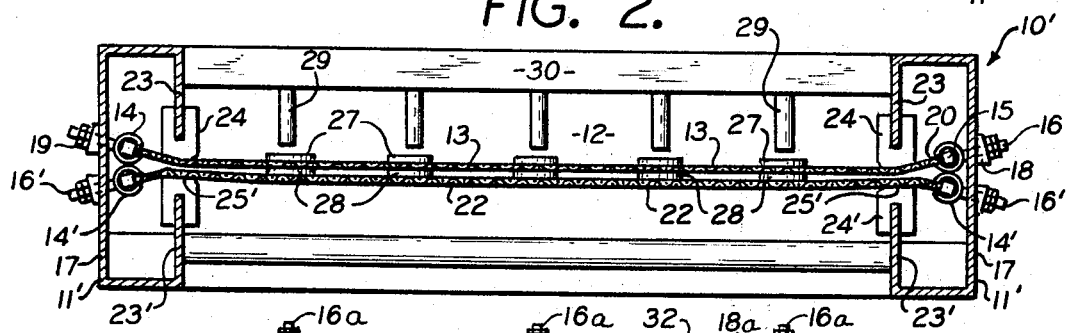
FIG. 2 is a side view, partially in section, of a screening machine similar to that of FIG. 1, but having an alternate screen tensioning arrangement.

As is obvious from FIGS. 1 and 2, the spacing between the screens 13 and 22 in the region within the aperture 12 is established by the thickness of the plates 28. Accordingly the thickness of the individual plates 28 can be made such that a desired spacing distribution between the screens 13 and 22 exists.

Vibratory motion is imparted to the screens 13 and 22 by the reciprocating tappets 29 which are driven to repeatedly strike the upper impact plates 27 so that the force of the tappet 29 blows is transmitted through the plates 27 and 28 into the screen 22 which is deflected thereby in a substantially normal direction, and the ensuing vibratory motion of the screen 22 is transferred to the screen 13 through the lower-impact plates 28.

The tappets 29 are supported from a carrier 30, which can either be constructed so as to rest on top of the frame 12, or be fastened thereto. The tappets 29 extend downward from the carrier 30, and are disposed so that each tappet 29 when reciprocated by the drive means (not shown) will strike its corresponding impact plate 27, with one tappet 29 being provided for each impact plate 27. Preferably, the tappets 29 are aligned so as to strike the centers of their respective impact plates 27.

Any suitable conventional drive means can be used for driving the tappets 29 in reciprocating motion, either in unison or in any desired sequence. For example, the tappets 29 can be driven independently by individual oscillating magnets (not shown) or by electromagnets (not shown). If magnetic impact plates 27 and 28 are used the tappets 29 can be made of a non-magnetic material, such as nylon, or provided with non-magnetic impact tips (not shown) so as to prevent any tendency to stick to the impact plates 27.

FIG. 2 shows an alternate embodiment of the screening machine 10' of the invention, which is basically similar in structure and in operation to the machine 10 of FIG. 1. The essential difference between the machines 10 and 10' lies in the feature that the machine 10' has a frame 11' which is provided with a lower interior lip 23' and ledge members 24' for the guidance of the coarse mesh screen 22 which is bent downward over the end surfaces 25' of the ledge members 24'. With this feature, the protective sheet 26 of FIG. 1 can be omitted, if desired, since the screens 13 and 22 are bent in opposite directions, and consequently are not in rubbing contact.

Figure 3:
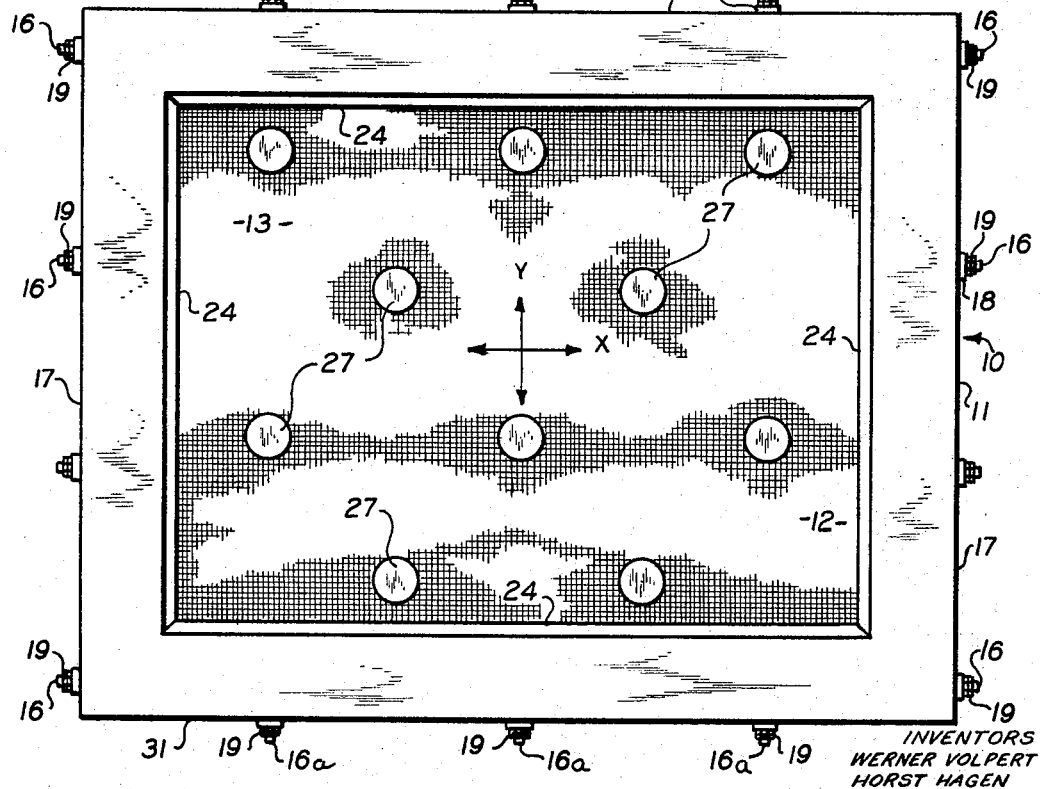
FIG. 3 is top view of a screen frame which can be used in the screening machines of FIGS 1 and 2, showing a typical impact plate arrangement.

As illustrated by FIG. 3, wherein the carrier 30 and tappets 29 have been removed to show the arrangement of the impact plates 27 on the fine mesh screen 13, the plates 27 and 28 (hidden in this view) are distributed at various locations on their respective screen 13, 22 surfaces in spaced relation between each pair of plates 27 and 28. This distribution pattern can be chosen so as to produce a predetermined mode of vibration in each of the screens 13 and 22 in response to the impact forces of the tappets 29.

Also, if desired, in the case of screens 13 and 22 having a rectangular shape, both pairs of edges in each screen, 13 and 22, can be provided with means for tension adjustment. For example, the holding members 14 and 14' can be provided to engage the spars 15 and 15' along the screen 13, 22 edges parallel to the direction Y, with the adjustment screws 16, 16' being used for tensioning said screens 13 and 22 in the X direction. Additional spars (not shown) similar to the spars 15 and 15' can be attached to the screen 13, 22 edges parallel to the direction X, and tension adjustment screws 16a connected directly at one end to said additional spars (not shown) can be provided for tensioning said screens 13 and 22 in the Y direction. In such a case, the screens 13 and 22 can be slid into the holders 14, 14' and the screws 16a can be slipped through bosses 18a in the frame 11.

To facilitate insertion and removal of the screens 13 and 22, suitable openings (not shown) can be provided in the front and rear sides 31, and 32 respectively of the frame 11, so that said screens 13 and 22 can be slid into place and the adjustment screws 16a can be easily slipped through their corresponding bosses 18a.

To adjust the tension of the screens 13 and 22 in the X direction the nuts 19 and 19' are turned so as to move the holding members 14, 14' and hence the spars 15, 15' inward or outward as desired or required. Tension in the Y direction in said screens 13 and 22 is adjusted by turning the corresponding nuts 19a in a similar manner.

To produce desired predetermined modes of vibration in the screens 13 and 22, in response to the impact forces produced by the tappets 29, the magnitude of the tension forces in said screens 13 and 22, can be set in relation to said impact forces. Also, or in combination with a given set of screen tension forces as aforesaid, the masses of the plates 27 and 28 can be selected to produce predetermined modes of vibration in said screens 13 and 22.

In general, the vibration modes of said screens 13 and 22 are established by several factors, including the impact force characteristics and their spatial distribution, the masses and shape of the plates 27 and 28, the magnitude and direction of the tension forces in the screens 13 and 22, the inertia and damping effects of the material to be screened, and the elastic properties of the screens 13 and 22. A particular mode of vibration in each of the screens 13 and 22 can be obtained by the application of routine engineering calculations in the design of the various elements in the screening machine according to the invention.

As desired, or required for a particular application of the screening machine according to the invention, the screens 13 and 22 can be made of any suitable conventional material, although generally, woven wire mesh screens will give satisfactory performance.

What is claimed is:

1. A material screening machine, which comprises a screen frame, a fine mesh screen disposed across said frame, a coarse mesh screen disposed across said frame in underlying parallel spaced relation to said fine mesh screen, a tension adjustment means connected to said frame and to said fine mesh screen to selectively adjust the tension thereof in each of two distinct lateral directions, a tension adjustment means connected to said frame and to said coarse mesh screen to selectively adjust the tension thereof in each of two distinct lateral directions, said fine and coarse mesh screens being disposed for independent tensioning adjustment by their respectively associated tension adjustment means, a first plurality of plate members secured to said fine mesh screen at individually distinct laterally spaced apart locations thereon, a second plurality of plate members secured to said coarse mesh screen at locations thereon underlying corresponding plates of said first plurality thereof, each of said first plurality of plates being disposed to receive impact forces and to transmit such received impact forces to corresponding underlying plates of said second plurality thereof, and a plurality of tappets each disposed for reciprocating movement along a path intersecting with a corresponding plate of said first plurality thereof and generally normal to the planes of said fine and coarse mesh screens to strike said plate and thereby excite vibrations in said fine and coarse mesh screens normal to their respective planes to aid in the screening of material through said screens.

2. The screening machine according to claim 1 wherein the spacing between said fine and coarse mesh screens is established by the thickness of said second plurality of plates, when said screens are tensioned for abutting contact between the underside of the fine mesh screen and the upper sides of said second plurality of plates.

3. The screening machine according to claim 1 wherein said fine and coarse mesh screens are rectangular in plan form, and wherein the tension adjustment means for each respective screen includes a first pair of spars, each of which is secured to an edge of one pair of opposite screen edges, a second pair of spars, each of which is secured to an edge of the other pair of screen edges, a first pair of slotted holding members, each having a continuous longitudinal slot disposed for engagement with a spar of said first pair, a second pair of slotted holding members, each having a continuous longitudinal slot disposed for engagement with a spar of said second pair, and at least one tension adjustment screw connected to each slotted holding member and to the screen frame, said tension screws being individually adjustable to selectively vary the screen tension along directions transverse to each opposite pair of screen edges.

References Cited

UNITED STATES PATENTS

| | | | |
|---|---|---|---|
| 145,906 | 12/1873 | Scholfield | 209—347 X |
| 923,108 | 5/1909 | Bell | 209—347 |
| 1,262,423 | 3/1918 | Worsham | 209—382 X |
| 1,459,839 | 6/1923 | Mitchell | 209—403 X |
| 1,983,676 | 12/1934 | Reynolds | 209—403 X |
| 2,183,991 | 12/1939 | Hasman | 209—403 |
| 3,070,230 | 12/1962 | Peterson | 209—403 |

FOREIGN PATENTS

| | | |
|---|---|---|
| 1,157,375 | 12/1957 | France. |
| 24,447 | 11/1908 | Great Britain. |

HARRY B. THORNTON, *Primary Examiner.*

FRANK W. LUTTER, *Examiner.*

R. HALPER, *Assistant Examiner.*